United States Patent [19]

Gaumer, Jr. et al.

[11] Patent Number: 5,280,710
[45] Date of Patent: Jan. 25, 1994

[54] CONTINUOUS PROCESS FOR PRODUCING SLUSH HYDROGEN

[75] Inventors: Lee S. Gaumer, Jr.; Robert B. Moore; Glenn E. Kinard, all of Allentown, Pa.

[73] Assignee: Air Products and Chemicals, Inc., Allentown, Pa.

[21] Appl. No.: 733,476

[22] Filed: Jul. 22, 1991

Related U.S. Application Data

[63] Continuation-in-part of Ser. No. 733,047, Jul. 19, 1991.

[51] Int. Cl.⁵ .............................................. F17C 5/00
[52] U.S. Cl. ........................................ 62/541; 62/68
[58] Field of Search ................... 62/10, 12, 54.1, 68

[56] References Cited

U.S. PATENT DOCUMENTS

| | | | |
|---|---|---|---|
| 3,455,117 | 7/1969 | Prelowski | 62/54.1 |
| 3,521,457 | 7/1970 | Hemstreet | 62/54.1 |
| 3,521,458 | 7/1970 | Huibers et al. | 62/54.1 |
| 4,009,013 | 2/1977 | Schrawer et al. | |

OTHER PUBLICATIONS

R. Schrawer "Production and Transport of Hydrogen Slush" Research Report T 75-22 (1974).

Primary Examiner—Ronald C. Capossela
Attorney, Agent, or Firm—Russell L. Brewer; James C. Simmons; William F. Marsh

[57] ABSTRACT

This invention relates to a continuous process for the preparation of slush hydrogen. The process comprises substantially continuously injecting liquid hydrogen at a temperature slightly above its triple point temperature into a slush hydrogen generator; forming solid hydrogen by removing hydrogen vapor from the slush hydrogen generator; fracturing and dispersing surface solid as it is formed into the slush; concentrating the crystalline solid particles in the slush to a level of at least 30%, and preferably from 45 to 60%, by weight; and substantially continuously removing the slush hydrogen from said slush hydrogen generator at a rate such that a substantially constant level of slush is maintained in said slush hydrogen generator.

4 Claims, 2 Drawing Sheets

CONTINUOUS PROCESS FOR PRODUCING SLUSH HYDROGEN

CROSS REFERENCE TO RELATED APPLICATION

This is a continuation-in-part application entitled "Continuous Process for Producing Slush Hydrogen" having Ser. No. 07/733047 and a filing date of Jul. 19, 1991, and is incorporated by reference.

FIELD OF THE INVENTION

This invention pertains to a process for the continuous production of slush hydrogen.

BACKGROUND OF THE INVENTION

Slush hydrogen comprises a mixture of liquid hydrogen and solid hydrogen at hydrogen's triple point of 13.8° K. and 52.8 torr. Slush hydrogen has significant advantages to Normal Boiling Point (NBP) hydrogen, which refers to liquid hydrogen having a boiling point of 20.2° K. at 760 torr, these advantages being increased density and increased heat absorption capacity before vaporization relative to NBP liquid hydrogen. Similarly to NBP liquid hydrogen, slush hydrogen has good flow properties which makes it easily transportable. These advantages make it particularly suitable as a fuel source and coolant in aircraft.

Processes have been developed to produce slush hydrogen and some are referred to as the Auger-type, magnetic refrigeration, freeze-thaw, nozzle expansion and pumping-down. By and large each of these processes has been a batch process and there have been few reported cases of a continuous process for producing slush hydrogen by any of the above processes.

Representative prior art for producing slush hydrogen is noted in R. Schrawer, *Production and Transport of Hydrogen Slush* Research Report T 75-22 (1974) published for the Federal Ministry for Research and Technology (West Germany). The process most favorably employed was based on a combination of processes and the process incorporated the pumping-down process and the nozzle expansion process. In that process liquid hydrogen at its normal boiling point at ambient pressure is transported through a siphon line into a nozzle, expanded and injected into a vessel. Solid hydrogen is formed at the nozzle and is dispersed into the vessel. A vacuum pump is used to reduce the pressure in the vessel and draw off incoming saturated vapor thereby causing additional cooling and solid hydrogen formation. Schrawer points out that the pumping-down process is inherently reversible and supplies a higher slush yield than the irreversible nozzle process which incorporates isenthalpic throttling. The advantage of isenthalpic throttling is that the process lends itself to continuous slush production although no process was disclosed.

U S. Pat. No. 4,009,013 discloses a variation in the processes described in the technical report above and pertains to the production of fine grained slush. In preparing slush having good transportation properties, solid particles in the slush are kept as small as possible. One problem associated with the pumping-down or pumping-off process is that solids develop which have a surface crystalline structure. To obtain finely grained slush for transportation it is necessary to destroy the crystalline surface solid, this usually being done by stirring. A finely grained slush is obtained in accordance with the patent by expanding high pressure liquefied gas through a nozzle into a chamber ultimately to a pressure below the pressure of the triple point in the gas-solid range and then to a pressure above the pressure of the triple point in the gas-liquid range. The cycling of pressure causes intermittent freezing and thawing of the surface hydrogen. Intermittent freezing coupled with agitation results in finely grained slush production.

SUMMARY OF THE INVENTION

This invention relates to a continuous process for the preparation of slush hydrogen by a modified version of the freeze-thaw technique. The process comprises substantially continuously injecting liquid hydrogen at a temperature near, but slightly above, its triple point temperature into a slush hydrogen generator; cooling the liquid hydrogen by removing sufficient hydrogen vapor from the generator to effect freezing of the liquid hydrogen and form a slush liquid hydrogen; concentrating the crystalline solid particles in the slush to a level of at least 30%, and typically from 45 to 60%, by weight; and substantially continuously removing the slush from said slush hydrogen generator at a rate such that a substantially constant level of slush is maintained in said slush hydrogen generator.

Advantages of the process include:

an ability to produce quality slush hydrogen in large quantities on a continuous basis;

an ability to produce slush hydrogen at excellent rates;

an ability to produce slush hydrogen with ease of control and with enhanced energy efficiency; and an ability to produce high density slush in a slush hydrogen generator without a substantial aging period.

DRAWING

DETAILED DESCRIPTION OF THE INVENTION

Figure 1:
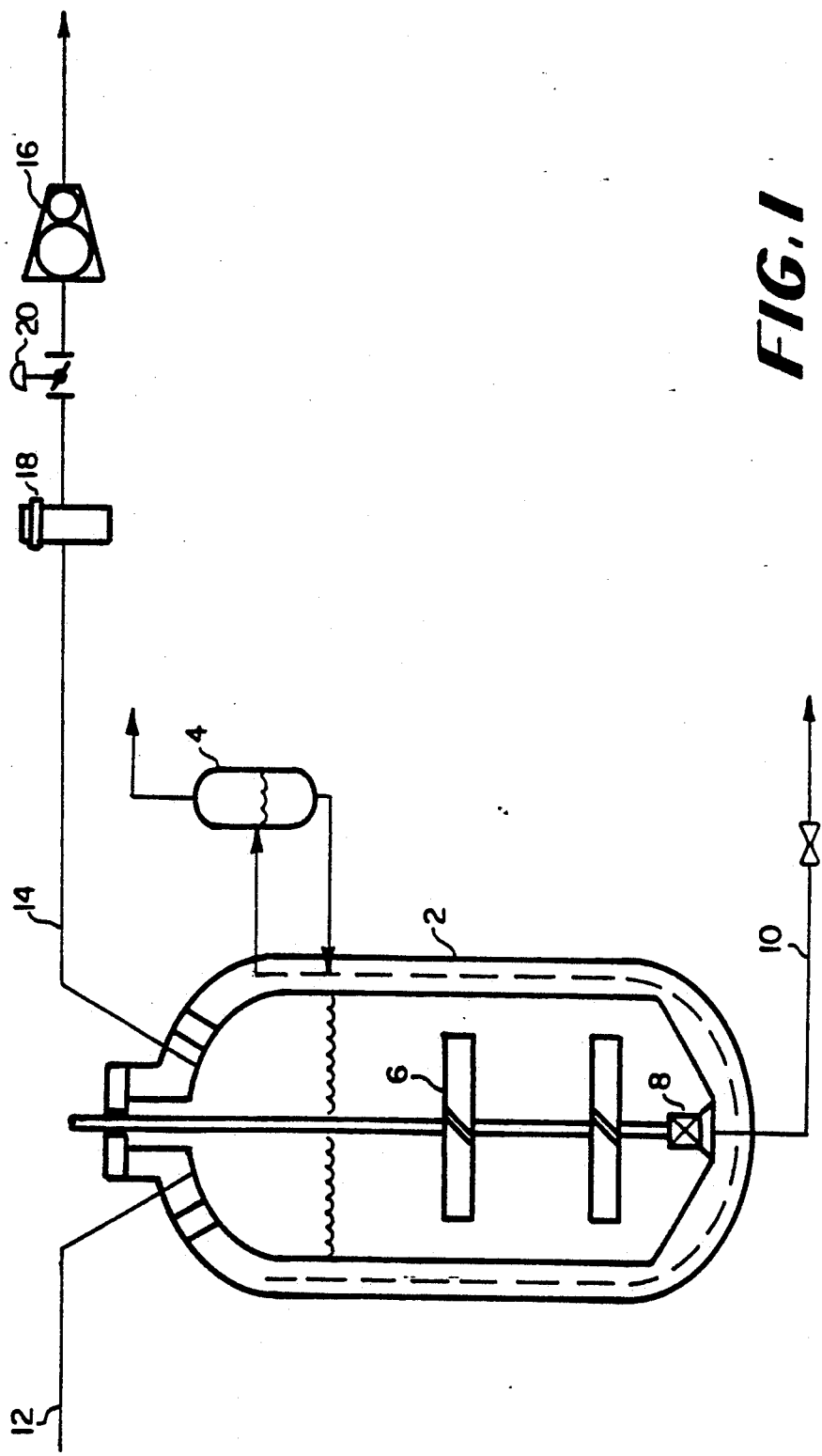
FIG. 1 is a diagram for a slush hydrogen generator used in the continuous process.

Referring to FIG. 1, there is shown a slush hydrogen generator 2 which is a jacketed vessel equipped for circulating liquid nitrogen or other refrigerant therein to intercept a portion of the heat in leakage. The jacketed vessel is shown equipped for circulation of liquid nitrogen through a heat intercept shield as a refrigerant via a separator 4 wherein liquid from the bottom of the separator is injected into the shield, circulated and gaseous nitrogen returned. Slush hydrogen generator 2 is equipped with agitation means 6 which includes two sets of agitator blades subsurface to the slush level. A primary purpose of agitation is to enhance dispersion of surface solid as it is formed and to mix it with incoming liquid hydrogen and liquid in the slush hydrogen generator. A wiper 8 is located near the bottom portion of slush hydrogen generator 2 to keep the solids fluid at the bottom and at slush removal line 10. Slush hydrogen generator 2 is equipped with an inlet line 12 for the introduction of liquid hydrogen which is at a temperature which is near but above the triple point temperature. It is also equipped with a vapor outlet line 14 by which evaporative cooling of the liquid hydrogen to form solid hydrogen in the slush hydrogen generator 2 is maintained.

Hydrogen vapor is removed from the slush hydrogen generator 2 by means of a system comprising a vacuum pump 16, and a preheater 18. Hydrogen vapor is preheated in preheater 18 to maintain operability of the throttling valve and vacuum pump system. Pressure control valve 20 permits the adjustment of pressure to the triple point pressure within slush hydrogen generator 2. Vacuum pump 16 is rated for process operation and is capable of reducing the pressure to below the triple point pressure in slush hydrogen generator 2.

In the continuous production of slush hydrogen by the modified version of the freeze-thaw process, liquid hydrogen above its triple point temperature is used to partially melt solid hydrogen particles and when coupled with agitation results in the production of fine grained solids in the slush. This process is continued until the solids level in the slush reaches at least 30% and preferably at least 45% to 60% below which level hydrogen crystals remain subsurface in the liquid hydrogen. Above about 55% solids, some of the solid hydrogen particles are above surface and there is an associated loss of efficiency in the process.

Quite unexpectedly, slush densities greater than 30%, and typically from 45 to 60%, can be achieved with little difficulty in slush hydrogen generator 2 by operating the slush hydrogen generator in the continuous mode. In contrast, slush densities higher than 30% are difficult to achieve with the freeze-thaw process when operating in the batch mode. Aging, which simply requires holding the batch under vacuum without cycling pressure, is required to increase the slush density to a level of 50%. Such aging process reduces throughput in the slush hydrogen generator.

Figure 2:
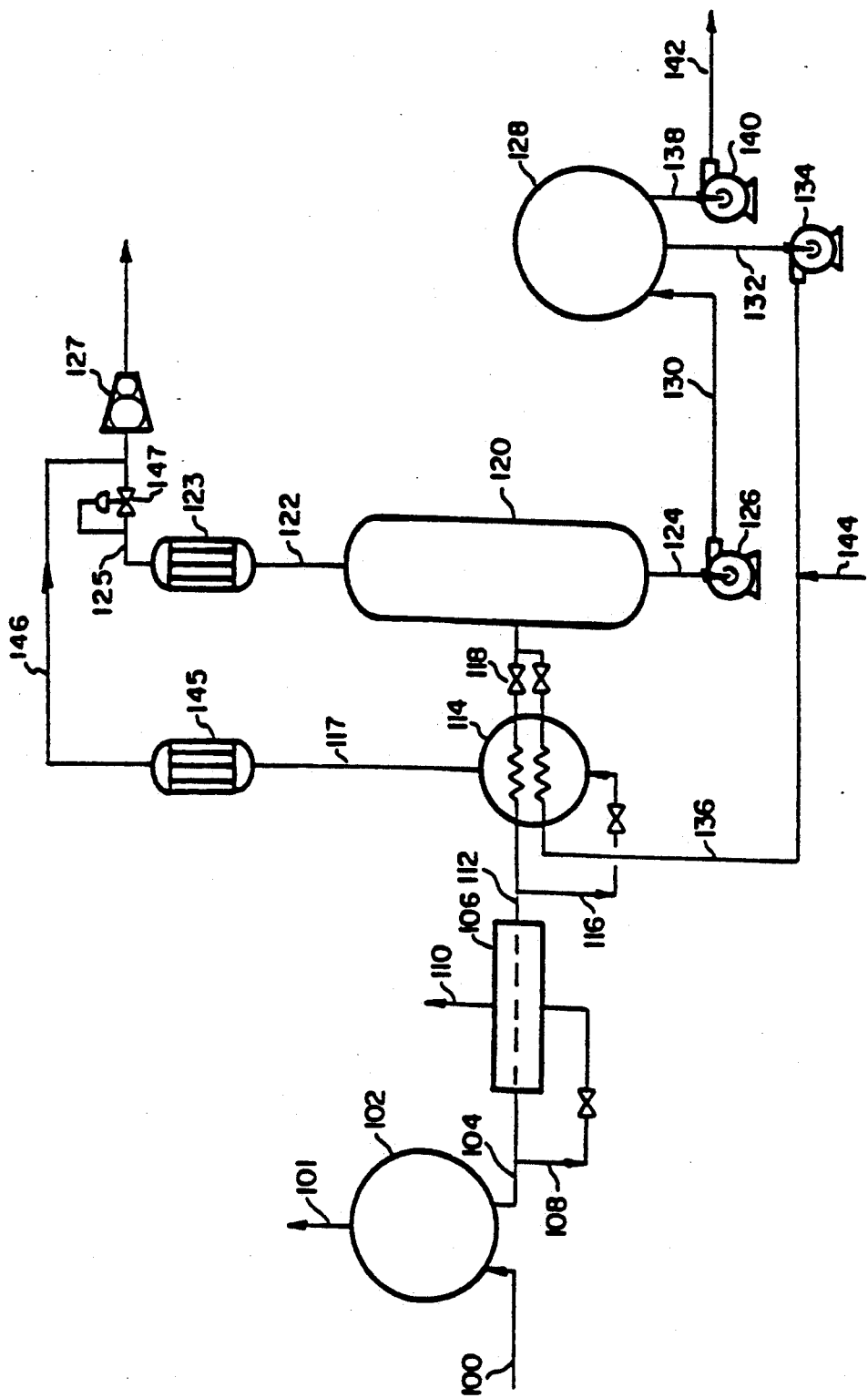
FIG. 2 represents a schematic diagram for a continuous process for producing slush hydrogen from NBP hydrogen including storage.

FIG. 2 is a flow diagram for the continuous production of slush hydrogen from a source of normal boiling point (NBP) liquid hydrogen to the storage of the slush hydrogen produced. More particularly, liquid hydrogen from a source such as tank truck, etc., is charged via line 100 to NBP hydrogen storage tank 102. NBP hydrogen at this point should have an ortho/para ratio of 5/95 at this point or lower.

NBP hydrogen having a 5/95 ortho/para ratio is removed via line 104 from NBP hydrogen vessel 102 and passed to an ortho/para catalytic converter 106 wherein the hydrogen is converted typically from 5/95 to lower the ortho/para form by catalytic means. Catalytic converter 106 contains a catalyst such as nickel silicate which facilitates the conversion of the hydrogen from the higher energy level of the ortho form to the lower energy level exhibited by the para form. Although conversion of the ortho hydrogen to para hydrogen can be accomplished by temperature reduction without catalytic conversion, the catalytic approach facilitates the conversion and enhances efficiency of the process. Even though a catalytic approach is used, some cooling is required in the catalytic converter and a portion of hydrogen from line 104 is removed via line 108, expanded and passed through converter 106 prior to exhaust via line 110.

NBP hydrogen preferably having a high level of hydrogen in the para form is removed from catalytic converter 106 via line 112 and introduced to heat exchanger 114. In heat exchanger 114 the NBP hydrogen is cooled to a temperature slightly above its triple point temperature of 13.8° K. or within 2° K. Optionally, catalytic converter 106 may be placed downstream of heat exchanger 114. When located downstream of the heat exchanger, the ortho/para hydrogen ratio is controlled primarily by the temperature of the inlet hydrogen.

Refrigeration for heat exchanger 114 is obtained by removing a portion of the liquid hydrogen from line 112 via line 116 wherein it is expanded and passed in indirect heat exchange with inlet NBP liquid hydrogen. The vapor is withdrawn via line 117, preheated in preheater 145 and then passed through line 146 (back pressure valve not shown) to the suction side of vacuum pump 127 of pressure control valve 147. The liquid hydrogen at a temperature slightly above its triple point but not above about 16° K. is removed from heat exchanger 114 via line 118 and expanded to essentially its triple point pressure for introduction to slush hydrogen generator 120.

Vapor is removed from slush hydrogen generator 120 via line 122 preheated in preheater 123 and the preheated hydrogen removed via line 125 to vacuum pump 127. Slush hydrogen having a concentration of solids of at least about 30%, and typically from 45 to 60% by weight, is removed via line 124. The slush is pumped generally on a continuous basis via pump 126 to slush aging and storage tank 128 via line 130. The solids are concentrated typically from the 30–60% solids from the slush hydrogen generator 120 to a concentration of 45–65% in the storage tank 128.

Aging and concentration of solids in storage tank 128 may be effected by withdrawing triple point liquid hydrogen via line 132 in the tank. Upstream from removal line 132 and pump 134 is a screen (not shown) which acts to filter the solid particles from the triple point liquid hydrogen as it is removed from slush tank 128. Filtration of solid particles aids in concentrating solids in the remaining liquid. This triple point liquid hydrogen is conveyed via removal line 136 for recycle to heat exchanger 114 for introduction back to slush hydrogen generator 120. Slush hydrogen product is removed via line 138 from the bottom of slush tank 128 and pumped via pump 140 and line 142 for use in aircraft or other purposes. Triple point liquid hydrogen may be returned from the service aircraft for recycle and conversion to slush hydrogen by means of line 144.

In the conventional freeze-thaw process, pressure oscillations, as described in copending application Ser. No. 07/733,047 and having a filing date of Jul. 19, 1991, are used to effect intermittent freezing of the liquid hydrogen thawing of the solid hydrogen to obtain fine grained slush. Although pressure oscillation as described in said copending application can be used, this invention, in contrast, uses substantially continuous introduction of liquid hydrogen at a temperature above the triple point to soften surface solids and effect partial thawing. Agitation at or near the surface fractures surface solid and contacts such fractured solid with inlet liquid hydrogen to soften such solids and permit the formation of fine grained slush. Continuous removal of hydrogen vapor can be applied to the slush hydrogen generator and by the controlled addition of inlet liquid hydrogen, high density slush can be produced at higher rates.

The modified version of the conventional freeze-thaw process for production of slush hydrogen is capable of being operated as a continuous process and produces slush quantities of 45 to 60 weight percent solids from liquid hydrogen. It is unexpected in that it was not heretofore conceived that 55 to 60 weight percent solids slush hydrogen could be produced directly in a continuous fashion without the need for aging the slush particles. The elimination of the aging time dramatically reduces the size of the equipment needed to produce the slush. This improvement is in addition to that achieved by running in the continuous rather than the batch mode. The plant size can be reduced.

What is claimed is:

1. In a process for producing slush hydrogen by a slush hydrogen generator, the improvement for producing slush hydrogen in high density and on a continuous basis which comprises:
   (a) substantially continuously injecting liquid hydrogen at a temperature slightly above its triple point temperature into said slush hydrogen generator;
   (b) forming solid hydrogen at the liquid-vapor interface by substantially continuously removing hydrogen vapor from the slush hydrogen generator;
   (c) fracturing and dispersing surface solid as it is formed in the liquid hydrogen slush;
   (d) concentrating the solid particles in the slush to at least 30% by weight; and,
   (e) substantially continuously removing the slush hydrogen from said slush hydrogen generator at a rate such that a substantially constant level of slush is maintained in said slush hydrogen generator.

2. The process of claim 1 wherein the temperature of the liquid hydrogen introduced to the slush by hydrogen generator is not above 16° K.

3. The process of claim 2 wherein the solids are concentrated in said slush hydrogen generator to a level from 45 to 60% solids by weight.

4. A process for producing slush hydrogen from liquid hydrogen on a continuous basis which comprises:
   (a) continuously injecting normal boiling point liquid hydrogen having an ortho/para ratio of 5/95 or less into a catalytic converter for conversion of said liquid hydrogen to liquid hydrogen having a lower ortho/para ratio;
   (b) cooling said liquid hydrogen to a temperature to 16° K. or less, but not to its triple point temperature or below;
   (c) expanding said liquid hydrogen to its triple point pressure;
   (d) injecting said liquid hydrogen into a slush hydrogen generator wherein hydrogen vapor is removed and said liquid hydrogen cooled sufficiently for forming solid hydrogen;
   (e) concentrating the solid hydrogen in the slush hydrogen generator to a level of at least 30% but less than 55% by weight of the slush;
   (f) transferring the slush hydrogen to a storage vessel; and,
   (g) concentrating the solids in said slush contained in said storage vessel from to a level of from 45 to 65% by weight.

* * * * *